United States Patent
Sui et al.

(10) Patent No.: US 10,880,360 B2
(45) Date of Patent: Dec. 29, 2020

(54) FILE TRANSMISSION IN A CLUSTER

(71) Applicant: INTERNATIONAL BUSINESS MACHINES CORPORATION, Armonk, NY (US)

(72) Inventors: Guang Han Sui, Beijing (CN); Peng Hui Jiang, Beijing (CN); Qin Li, Shanghai (CN); Jian Hua Zhang, Beijing (CN); Ping Xiao, Beijing (CN); Niao Qing Liu, Beijing (CN); Xiang Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/375,905

(22) Filed: Apr. 5, 2019

(65) Prior Publication Data
US 2020/0322416 A1    Oct. 8, 2020

(51) Int. Cl.
*H04L 29/08* (2006.01)

(52) U.S. Cl.
CPC .......... *H04L 67/06* (2013.01); *H04L 67/1097* (2013.01)

(58) Field of Classification Search
CPC .............................. H04L 67/06; H04L 67/1097
See application file for complete search history.

(56) References Cited

U.S. PATENT DOCUMENTS

| 6,718,361 B1 * | 4/2004 | Basani ................ H04L 67/1095 707/999.01 |
| 7,349,906 B2 * | 3/2008 | Cherkasova ........ H04L 67/1095 |
| 7,873,868 B1 | 1/2011 | Heideman et al. |
| 8,006,124 B2 | 8/2011 | Park et al. |
| 2014/0067992 A1 * | 3/2014 | Saeki ................ H04L 29/08549 709/214 |
| 2016/0321286 A1 * | 11/2016 | Chen ................... G06F 16/1824 |
| 2017/0034269 A1 | 2/2017 | Nagasubramaniam et al. |

OTHER PUBLICATIONS

Mell et al., "The NIST Definition of Cloud Computing", National Institute of Standards and Technology, Special Publication 800-145, Sep. 2011, pp. 1-7.

* cited by examiner

*Primary Examiner* — John M Macilwinen
(74) *Attorney, Agent, or Firm* — Richard A. Wilhelm

(57) ABSTRACT

A file is transmitted to a plurality of hosts. The hosts are divided into host groups. A host in each host group is selected as a master host. A data block is received by a master host in a host group. The master host sends the data block to both a master host in a next host group and a next host in the host group in order that the next host in the host group sends the data block to a next host of the next host in the host group, and the master host in the next host group sends the data block to both a master host in a next host group of the next host group and a next host of the next host in the next host group.

20 Claims, 6 Drawing Sheets

FILE TRANSMISSION IN A CLUSTER

BACKGROUND

The present disclosure relates to the field of information technology, and more specifically, to methods, systems and computer program products for transmitting a file to a plurality of hosts in a cluster.

SUMMARY

Example embodiments of the present disclosure disclose methods, systems, and computer program products for optimization for data transmission among many hosts in a cluster.

In an aspect, a method for transmitting a file to a plurality of hosts in a cluster is disclosed. According to the method, the plurality of hosts are divided into a plurality of host groups, and at least one host in each host group is selected as a master host, and the file is divided into one or more data blocks. In the method, at least one data block of the one or more data blocks may be received by at least one master host in a host group first. And then the at least one data block may be sent to both at least one master host in a next host group and a next host in the host group by the by at least one master host in a host group in order that the next host in the host group sends the at least one data block to a next host of the next host in the host group, and the at least one master host in the next host group sends the at least one data block to both at least one master host in a next host group of the next host group and a next host of the next host in the next host group in which the at least one data block is received by the at least one master host in the host group from at least one master host in a previous host group or from a file server.

In another aspect, a computer-implemented system is disclosed. The system may include a computer processor coupled to a computer-readable memory unit, said memory unit comprising instructions that when executed by the computer processor implements the above method.

In yet another aspect, a computer program product is disclosed. The computer program product comprises a computer readable storage medium having program instructions embodied therewith. When executed on one or more processors, the instructions may cause the one or more processors to perform the above method.

It is to be understood that the summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, the same or similar reference numerals represent the same or similar elements.

DETAILED DESCRIPTION

Figure 1:
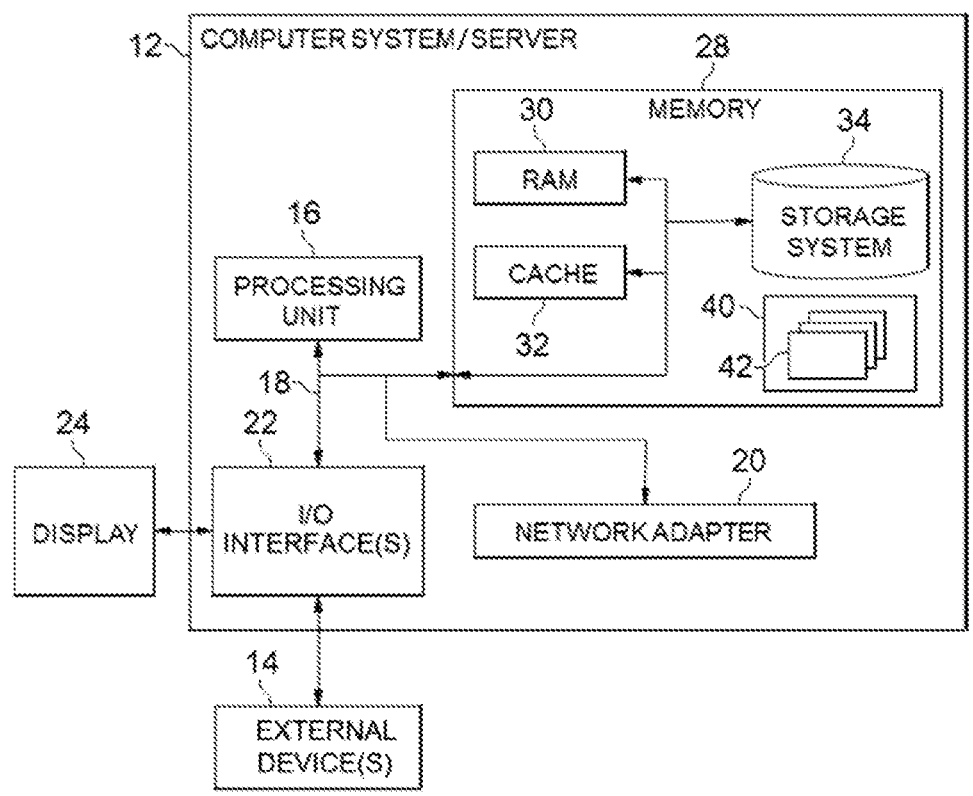
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
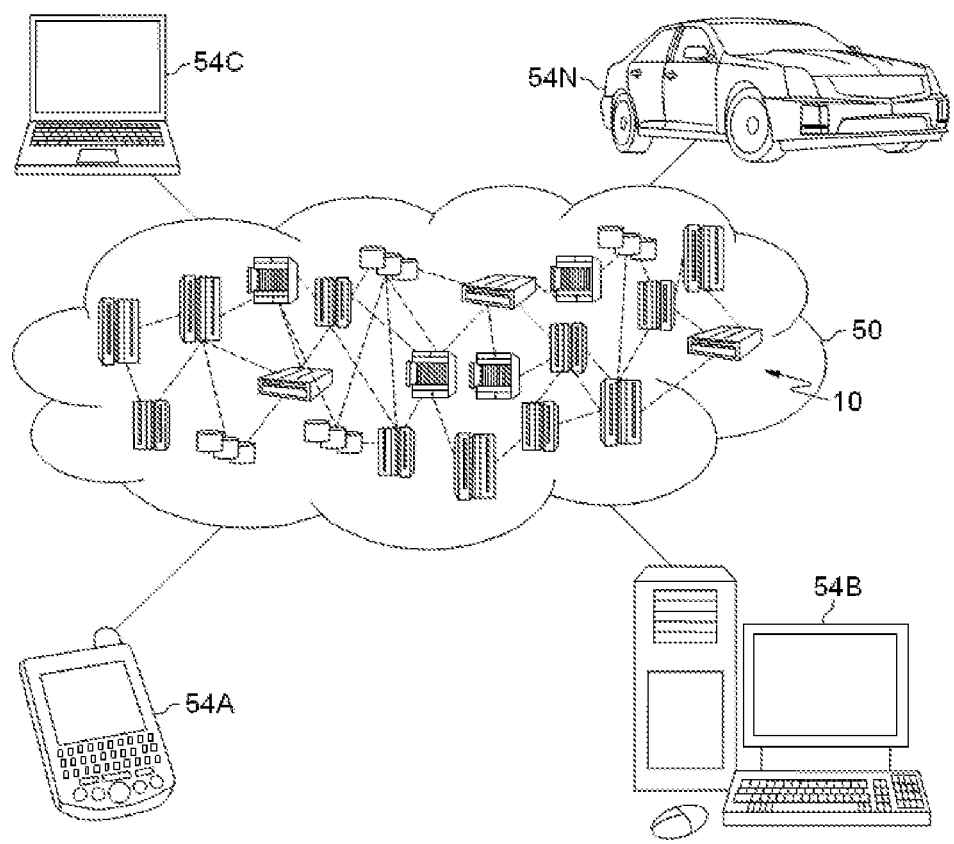
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
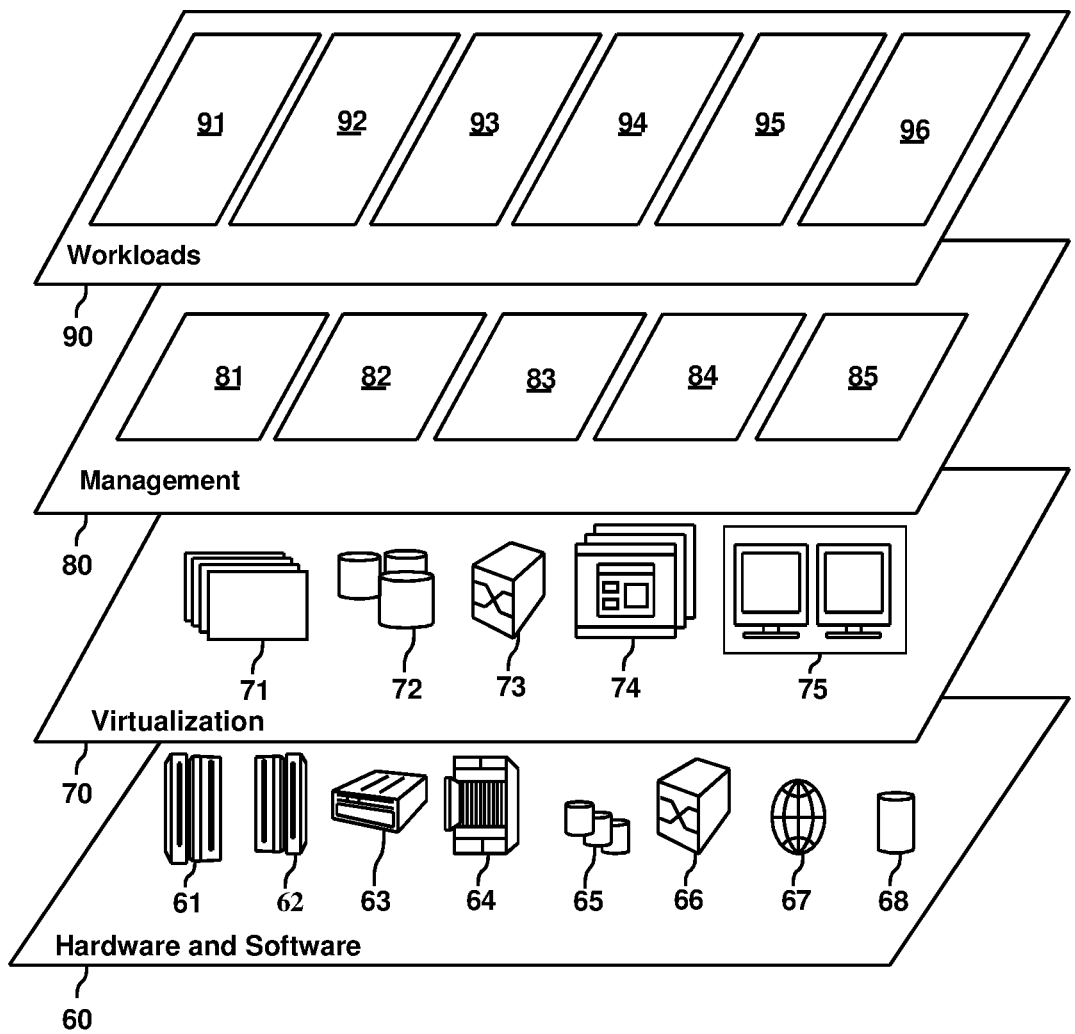
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and file transmission 96.

In a big cluster with thousands of hosts, sometimes, files need to be transmitted to every host in the cluster to build an environment.

Figure 4:
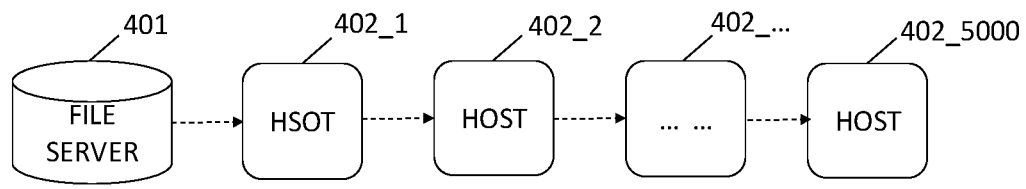
FIG. 4 depicts a block diagram illustrating a system structure for transmitting a file to thousands of hosts in a cluster according to an embodiment.

FIG. 4 depicts a block diagram illustrating a system structure for transmitting a file to thousands of hosts in a cluster. Suppose there are 5000 hosts 402 in the cluster, it can be found in FIG. 4 that the 5000 hosts 402 are linked as a pipeline, and a host sequence in the pipeline is {402_1, 402_2, . . . , 402_5000}. It is assumed that both a total bandwidth between a file server 401 and any host 402 and a total bandwidth between any two hosts 402 are W, and the file may be divided into many data blocks to be transmitted by, for example, the file server 401 or any other device which is not shown in FIG. 4. Then the file server 401 may send these data blocks one by one to the host 402_1 using a total output bandwidth W of the file server 401. After receiving a data block sent by the file server 401 using a total input bandwidth W of the host 402_1, the host 402_1 may save the data block received to a local storage, such as a disk. After that, the host 402_1 may send the data block to a next host 402_2 in the host sequence using a total output bandwidth W of the host 402_1. And the host 402_2 may also save the data block received to a local storage, and then may send the data block to a next host 402_3 in the host sequence using a total output bandwidth W of the host 402_2, and so on, until the data block is sent to a last host 402_5000, which may just save the data block received to a local storage without sending the data block to other hosts. In this way, except that the file server 401 uses the total output bandwidth W and an input bandwidth 0 and the last host

402_5000 uses the total input bandwidth W and an output bandwidth 0, other hosts use the total output bandwidth W and the total input bandwidth W, thus the file can be transmitted to every hosts in the cluster using the bandwidth W. For example, if W=1G, and if S is the file size and S=2G, then the transmission time is about S/W=2 second.

But when there are thousands of hosts, such as 5000 hosts in the above example, it is not a good solution to transmit files with the above solution, as once there is something wrong with any of the thousands of hosts, the whole transmission will be broken, and it takes time to recover.

Thus, there is a need for developing a method for transmitting a file to a plurality of hosts in a cluster to solve the above problems.

To simplify the description, the number of hosts is assumed to be 5000 in the cluster in the description of this disclosure. Those skilled in the art can understand that this assumption does not affect the description of methods, systems and computer products of the present invention, and the number of hosts in the cluster could be any other number other than 5000.

Figure 5:
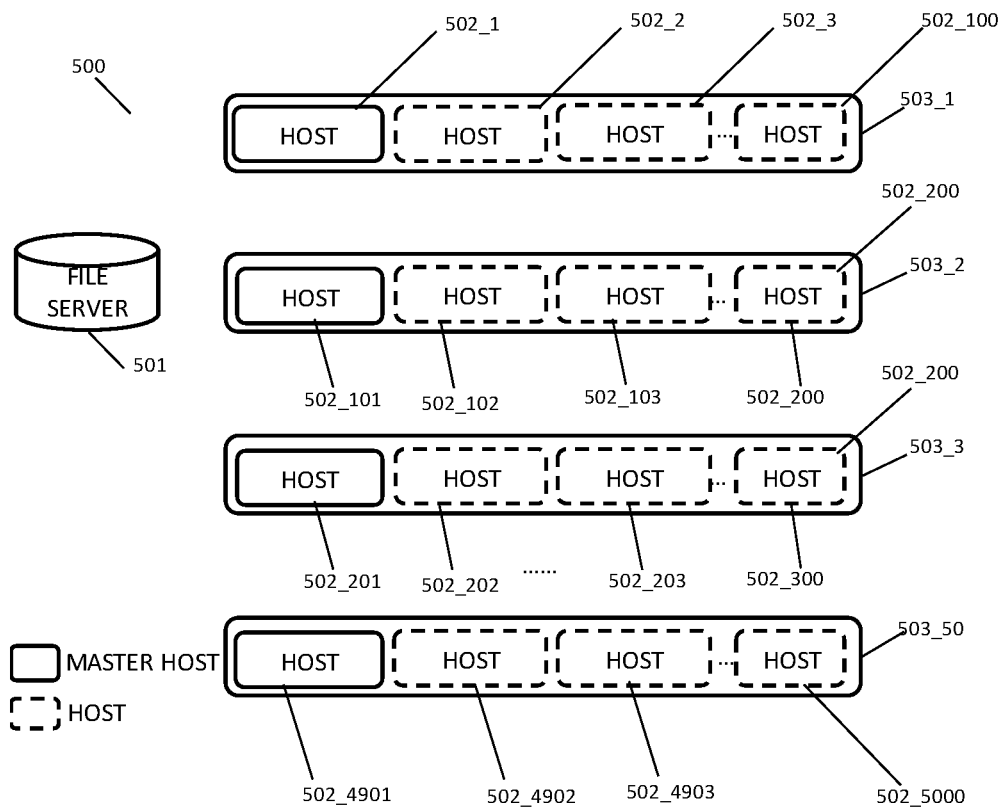
FIG. 5 depicts a block diagram illustrating a system structure for transmitting a file from a file server to a plurality of hosts in a cluster according to an embodiment of the present invention.

FIG. 5 depicts a block diagram illustrating a system structure 500 for transmitting a file from a file server to a plurality of hosts in a cluster according to an embodiment of the present invention. Referring to FIG. 5, the system 500 comprises a file server 501 for transmitting files to a plurality, e.g., 5000 hosts in the cluster and the 5000 hosts, with reference numbers in FIG. 5 as 502_1, 502_2, . . . , 502_5000 respectively, for receiving the files directly or indirectly from the file server 501 via a network. In some embodiments, all hosts may be divided into a plurality of host groups, for example, 50 host groups. In one example, to simplify the description, all the hosts in the cluster described herein are evenly divided into 50 host groups and so there are 100 hosts in each group. In other words, the 50 host groups in FIG. 5 are the host group 503_1 with a host sequence {502_1, 502_2, . . . , 502_100}, the host group 503_2 with a host sequence {502_101, 502_102, . . . 502_200}, . . . , the host group 503_50 with a host sequence {502_4901, 502_4902, . . . 502_5000} respectively. And at least one host in each host group can be selected as a master host. And in the above example, the hosts 502_1, 502_101, 502_201, 502_301 . . . , 502_4901 may be selected as master hosts for the host groups 503_1, 503_2, . . . 503_50 respectively.

In another example, the all hosts may be divided into 40 or other number of host groups and the number of hosts in each host group may or may not be the same. It can be understood that even when all hosts are divided into N host groups and the number of hosts in each host group are different, the similar technical effect can be achieved with this invention by reference to the related descriptions herein.

The process for transmitting a file from the file server 501 to hosts in the system 500 can be controlled or enabled by a controller (not shown in FIG. 5), which may be a stand-alone computer connecting to the cluster via a network or in the cluster, or may be computer software, such as an application, or a software plugin, etc. to communicate with the cluster via a network.

Figure 6:
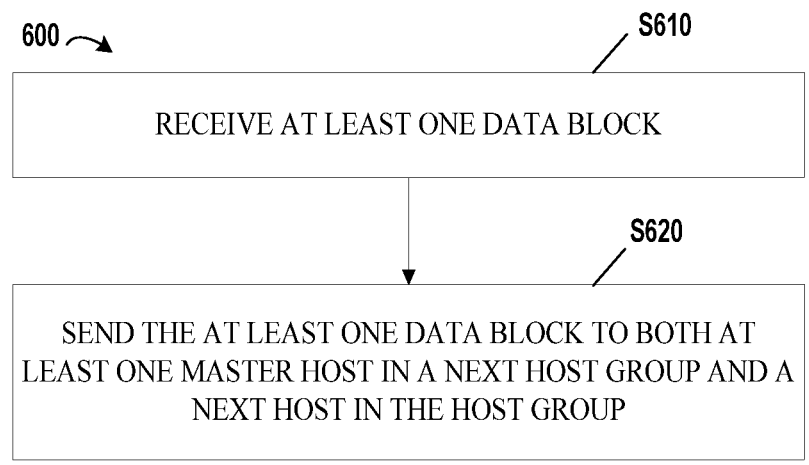
FIG. 6 depicts a flow diagram illustrating a method for at least one master host in a host group to transmit a file to a plurality of hosts in a cluster according to an embodiment of the present invention.

FIG. 6 depicts a flow diagram illustrating a method 600 for at least one master host in a host group to transmit a file to a plurality of hosts in a cluster according to an embodiment of the present invention, which can be controlled or initialized by the controller and implemented by components in the system 500. In the cluster, the hosts are divided into a plurality of host groups, at least one host in each host group is selected as a master host, and the file is divided into one or more data blocks. Process for grouping hosts and selecting master hosts can be implemented through a configuration operation. In one embodiment, the controller may provide a user interface so that the system administrator can receive information of all hosts and can configure the above parameters (e.g., group size, groups, master hosts, host sequence, etc.). In another embodiment, the controller may provide the system information of all hosts and then the system can automatically determine the above parameters, for example, determine N host groups based on a number of the hosts in the cluster, select hosts (for example, by host ID, host IP address, etc.) for each host group randomly, and select at least one master host in each host group randomly, etc. In some embodiments, the controller may own the host group structure and may totally control the file transmission, e.g. control each action of both the file server and the plurality of hosts. In some embodiments, the controller may send the host group structure, related parameters and the program used by each host or the file server to each host or the file server in order that each host and the file server may execute their respective programs.

Referring to FIG. 6, at step S610, at least one master host in a host group may receive at least one data block of the one or more data blocks of a file from at least one master host in a previous host group or from a file server.

At step S620, at least one master host in the host group may send the at least one data block to both at least one master host in a next host group and a next host in the host group in order that the next host in the host group sends the at least one data block to a next host of the next host in the host group, and the at least one master host in the next host group sends the at least one data block to both at least one master host in a next host group of the next host group and a next host of the next host in the next host group.

In an embodiment, referring to FIG. 6, at step S610, a first master host in a first host group may receive at least one data block of the one or more data blocks of a file from at least one master host in a previous host group or from a file server. At step S620, The first master host in the first host group may send the at least one data block to both a second master host in a second host group and to a first host in the first host group in order that the first host in the first host group sends the at least one data block to a second host in the first host group, and the second master host in the second host group sends the at least one data block to both a third master host in a third host group and to a first host in the second host group.

In some embodiments, the at least one master host in the host group may send the data block to the at least one master host in the next host group first and then may send the data block to the next host in the host group. In some embodiments, the at least one master host in the host group may send the data block to the next host in the host group first and then may send the data block to the at least one master host in the next host group. In some embodiments, the at least one master host in the host group may send the data block substantially simultaneously to both the at least one master host in the next host group and the next host in the host group.

In some embodiments, once at least one master host in a last host group receives the data block, the at least one master host in the last host group may just send the data block to a next host in the last host group.

In some embodiments, once a last host in each host group receives the data block, the last host in each host group may just save the data block to a local storage.

Figure 7:
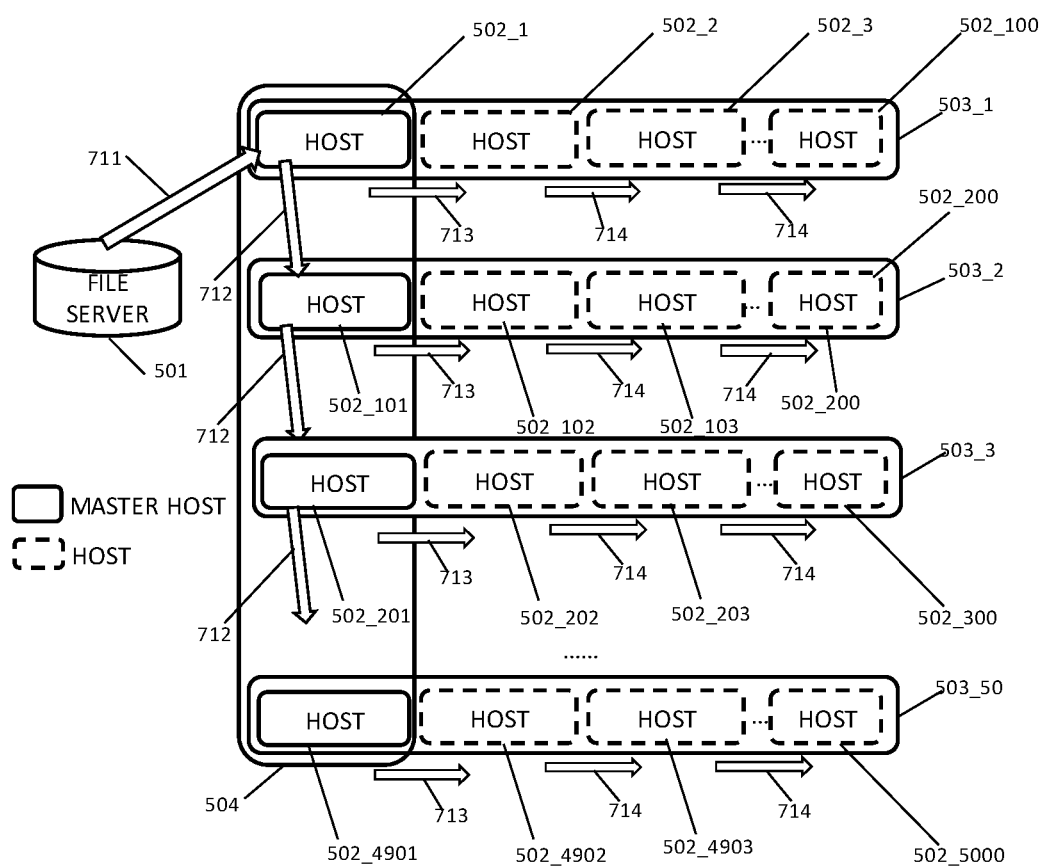
FIG. 7 depicts a block diagram illustrating a process for transmitting a file from a file server to a plurality of hosts in a cluster shown in FIG. 5 according to an embodiment of the present invention.

In some embodiments, FIG. 7 depicts a block diagram illustrating a process for transmitting a file from a file server 501 to a plurality of hosts in a cluster shown in FIG. 5 according to an embodiment of the present invention. The same reference numbers in both FIG. 5 and FIG. 7 generally refers to the same components. It is assumed that there is one master host in each host group, e.g. the hosts 502_1, 502_101, 502_201, 502_301, . . . , 502_4901 are selected as master hosts for the host groups 503_1, 503_2, . . . 503_50 respectively, and the file has been divided into a plurality of data blocks.

Referring to FIG. 7, the file server 501 may send each data block one by one to the master host 502_1 in the host group 503_1 using, for example, total output bandwidth W of the file server, as indicated by a reference number 711 in FIG. 7. That is to say, the time duration of sending one data block equals to the size of the data block divided by the bandwidth W. And the master host 502_1 may receive a data block of the plurality of the data blocks and save the data block received to a local storage first, and then may send the data block to the next master host 502_101 in the next host group 503_2 using, for example, total output bandwidth W of the master host 502_1 first, as indicated by a reference number 712 in FIG. 7, and then may send the data block to the host 502_2 in the host group 503_1 using, for example, total output bandwidth W of the master host 502_1, as indicated by a reference number 713. Once the data block is received using, for example, total input bandwidth W of the master host 502_101, the master host 502_101 may save the data block to a local storage and then may send the data block to the next master host 502_201 in the next host group 503_3 using, for example, total output bandwidth W of the master host 502_101 first, as indicated by a reference number 712, and then send the data block to the next host 502_102 in the host group 503_2 using, for example, total output bandwidth W of the master host 502_101, as indicated by a reference number 713 . . . , until the data block is received by the last master host 502_4901, which may just store the data block to a local storage, and then may send the data block to the next host 502_4902 in the host group 503_50 using, for example, total output bandwidth W of the master host 502_4901, as indicated by a reference number 713. It can be noted that, as one alternative, each master host in a host group (the host 502_101 in the host group 503_2, for example) may send the data block to its next host in the same host group (the host 502_102 in the host group 503_2, for example) using, for example, its total output bandwidth W first, and then may send the data block to a next master host in the next host group (the host 502_201 in the host group 503_3, for example) using, for example, its total output bandwidth W. In addition, each master host in a host group (the host 502_101 in the host group 503_2, for example) may almost simultaneously send the data block to its next host in the same host group (the host 502_102 in the host group 503_2, for example) using, for example, its half output bandwidth W/2 and the next master host in its next host group (the host 502_201 in the host group 503_3, for example) using, for example, its half output bandwidth W/2, respectively.

And then, any host other than the master host in a host group, such as the host 502_202 in the host group 503_3 which has received the data block from the host 502_201, may save the data block to its local storage and then may send the data block to the next host 502_203 in the host group 503_3 using, for example, its total output bandwidth W. And so do other hosts. Accordingly, all hosts can get all data blocks of the file one by one in this way. When all hosts in the cluster get all the data blocks of the file, each host can combine all data blocks received into a file, then all hosts in the cluster can get the file.

Using above method, the file server 501 can send the data blocks one by one using, for example, its total output bandwidth W, and all hosts in the cluster can get the data blocks one by one using, for example, its total input bandwidth W and can send the data blocks one by one to its neighboring host (either to a master host in a neighboring host group or to a host in the same host group) using, for example, its total output bandwidth W. Thus time duration to transfer a file with size S is 2S/W using this method as there are two data transmission directions, where S/W is for the at least one master host in the first host group to transmit the file to the at least master host in the last host group, and S/W is for the at least one master host in the last host group to transmit the file to the last host in the last host group. The time duration 2S/W is twice as long as the time duration S/W used in the solution shown in FIG. 4. But if there is something wrong with any of the thousands of hosts, only part of the whole transmission will be broken, for example, if a master host is broken, only hosts in the same host group, subsequent master hosts and the hosts in the same host groups with the subsequent mast hosts will be affected. And if a host other than a master host is broken, only subsequent hosts in the same host group with the host will be affected. This problem is easy to recover.

And it could be understood that the bandwidth usage in the description of FIG. 7 is for the purpose of example, and this invention is not limited to the use of the specific bandwidth described above, and those skilled in the art may adopt different bandwidth allocation methods.

Figure 8:
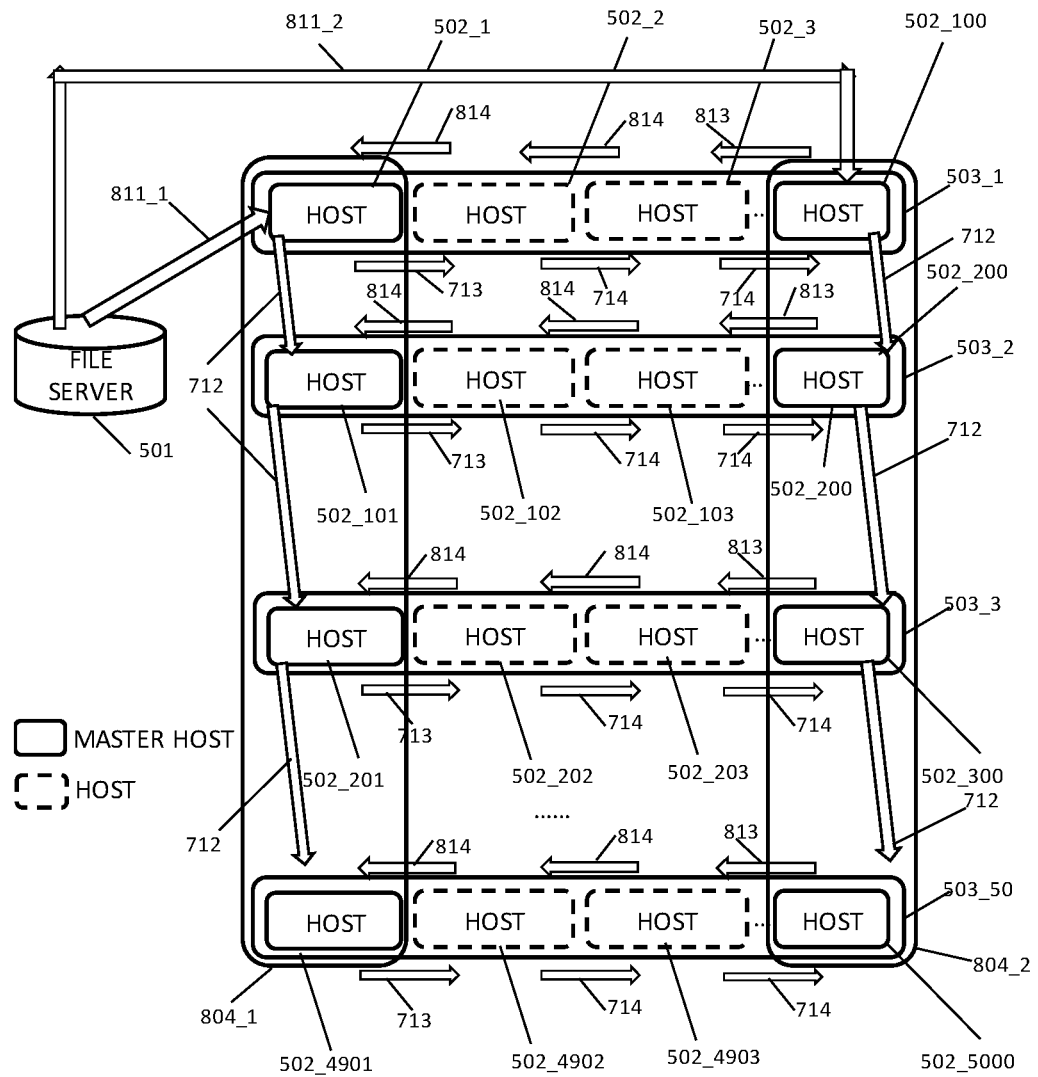
FIG. 8 depicts a block diagram illustrating another process for transmitting a file from a file server to a plurality of hosts in a cluster shown in FIG. 5 according to another embodiment of the present invention.

FIG. 8 depicts a block diagram illustrating another process for transmitting a file from a file server to a plurality of hosts in a cluster shown in FIG. 5 according to another embodiment of the present invention. The same reference in FIG. 5, FIG. 7 and FIG. 8 generally refers to the same components. It is assumed that two master hosts in each host group are selected as master hosts, e.g. besides that the hosts 502_1, 502_101, 502_201, 502_301, . . . , 502_4901 are selected as master hosts for the host groups 503_1, 503_2, . . . 503_50 respectively, the hosts 502_100, 502_200, 502_300, 502_400, . . . , 502_5000 are also selected as master hosts for the host groups 503_1, 503_2, . . . 503_50 respectively. The hosts 502_1, 502_101, 502_201, 502_301, . . . , 502_4901 form a first master host group, indicated by a reference number 804_1, and the hosts 502_100, 502_200, 502_300, 502_400, . . . , 502_5000 form a second master host group, indicated by a reference number 804_2.

Referring to FIG. 8, the file server 501 may send half of all data blocks one by one to the host 502_1 in the host group 503_1 using, for example, its half output bandwidth W/2 indicated by a reference number 811_1 in FIG. 8, and may send almost simultaneously another half of all data blocks one by one to the host 502_100 in the host group 503_1 using, for example, its half output bandwidth W/2 indicated by a reference number 811_2 in FIG. 8. And each of the master hosts 502_1, 502_101, 502_201, 502_301, . . . , 502_4901 in the first master host group may transmit a first received data block almost simultaneously to both a next master host in the first master host group (e.g. a master host in the next host group) using, for example, its half output bandwidth W/2 and a next host in the same host group using, for example, its half output bandwidth W/2. At the same time, each of the master hosts 502_100, 502_200, 502_300, 502_400, . . . , 502_5000 in the second master host group may transmit a second received data block almost simultaneously to both a next master host in the second master host group (e.g. a master host in the next host group) using, for example, its half output bandwidth W/2 and a next host in the same host group using, for example, its half output bandwidth W/2. Specifically, the master host 502_100 may save the second received data block to a local storage first and then may send the second data block almost simultaneously both to the next master host 502_200 in the host group 503_2 using, for example, its half output bandwidth W/2, as indicated by a reference number 812 and to the host 502_99 in the host group 503_1 using, for example, its half output bandwidth W/2, as indicated by a reference number 813.

In some embodiments, a master host can maintain a master host group list, for example, each master host among master hosts 502_1, 502_101, . . . , and 502_4901 can maintain a master host group list {502_1, 502_101, . . . 502_4901}, so that each master host can determine a next master host in the master host group (e.g. a master host in the next host group) based on the maintained master host group list. For example, the host 502_101 can determine that a next master host in the master host group is the host 502_201. It can also be found that the first master host and the second master host in the same host group may maintain respective host sequences which are reversed, for the host list in the same host group. For example, the first master host 502_1 in the first host group maintains a host group list with a host sequence {502_1, 502_2, . . . , 502_100} and the second master host 502_100 in the first host group maintains a host group list with a host sequence {502_100, 502_99, . . . , 502_1}. And the next host to a master host in the same host group is based on the maintained sequence by the master host. For example, the master host 502_100 can determine that its next host in the first host group is host 502_99 based on the maintained sequence {502_100, 502_99, . . . , 502_1}.

And for any host other than the master host, there is a need to transmit a first received data block and a second receive data block in two directions if there are two master hosts in each host group. In some embodiments, a host other than the master host, such as the host 502_202, may maintain two reversed host sequence for its host group, for example, two reversed sequence {502_201, 502_202, 502_203, 502_204, . . . , 502_300} and {502_300, 502_299, . . . , 502_203, 502_202, 502_201} are maintained by the host 502_202. The next host to a host in a host group is based on the maintained sequences by the host and data block transmission direction. Specifically, the next host to the host in its host group can be determined based on the maintained sequence by the host and a previous host from which the host receives the data block.

Then in some embodiments, a host 502_202 is still used as an example. If the host 502_202 has received the data block from a host 502_203, it may save the data block to a local storage and then send the data block to a next host 502_201 in its host group 503_3 using, for example, its half output bandwidth W/2. And if the host 502_202 has received the data block from the host 502_201, it may save the data block to a local storage and then send the data block to the next host 502_203 in its host group 503_3 using, for example, its half bandwidth W/2. So do other hosts. Accordingly, all hosts can get all data blocks of the file one by one in this way. When all hosts in the cluster get all the data blocks of the file, each host can combine all data blocks received into a file, then all hosts in the cluster can get the file.

As there are two master hosts in FIG. 8, the file size to be transmitted to one master host is S/2. Thus, the time duration to transfer a file with size S to the cluster is S/W using the method shown in FIG. 8, which is the same as the time duration used in the solution shown in FIG. 4. And if there is something wrong with any of the thousands of hosts, the whole transmission will be not broken, for example, if a master host is broken, only subsequent mast hosts and hosts in the same host groups with the subsequent mast hosts will be affected. And if a host other than a master host is broken, only subsequent hosts in the same host group with the host will be affected. And it is easy to recover.

And it could be understood that the bandwidth usage in the description of FIG. 8 is for the purpose of illustration, and this invention is not limited to the use of the specific bandwidth described above, and those skilled in the art may adopt different bandwidth allocation methods.

Based on the above example, it is easy for those skilled in the art to think out the other examples, such as more than two master hosts can be selected in each host group, which are not described in details in this disclosure. But those skilled in the art can understand that the transmission process may be too complex to be implemented.

It should be noted that the processing for transmitting a file to a plurality of hosts in a cluster according to embodiments of this disclosure could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for transmitting a file to a plurality of hosts in a cluster, wherein the plurality of hosts are divided into a plurality of host groups, and at least one host in each host group is selected as a master host, and the file is divided into one or more data blocks, the method comprising:

receiving, by at least one master host in a first host group, at least one data block of the file, wherein the at least one data block is received from a file server;

sending, by the at least one master host in the first host group, the at least one data block to both at least one master host in a second host group and a first, non-master host in the first host group;

sending, by the first, non-master host in the first host group the at least one data block to a second, non-master host in the first host group; and sending, by the at least one master host in the second host group the at least one data block to both at least one master host in a third host group and a first, non-master host in the second host group.

2. The method of claim 1, wherein two hosts are selected as master hosts in each host group, and wherein the receiving, by at least one master host in the first host group, at least one data block of the file comprises:

receiving, by a first master host in the first host group, a first data block of the file; and receiving, by a second master host in the first host group, a second data block of the file.

3. The method of claim 2, wherein the sending, by the at least one master host in the first host group, the at least one data block to both at least one master host in a second host group and a first, non-master host in the first host group comprises:

sending, by first master host in the first host group, the first data block received simultaneously to both a first master host in the second host group and the first, non-master host in the first host group; and sending, by a second master host in the first host group, the second data block received simultaneously to both a second master host in the second host group and the second, non-master host in the first host group.

4. The method of claim 2, wherein the first data block of the file received by the first master host is transmitted to each of the non-master hosts of the first host group in a first sequence and the second data block of the file received by the second master host in the first host group is transmitted to each of the non-master hosts of the first host group in a second sequence, wherein the second sequence is the reverse of the first sequence.

5. The method of claim 4, wherein a non-master host other than a master host in the first host group maintains the first and second sequences.

6. The method of claim 1, wherein two hosts are selected as master hosts in each host group, and wherein the receiving, by at least one master host in the first host group, at least one data block of the file comprises:

receiving, by a first master host in the first host group, a first data block of the file using half input bandwidth of the first master host in the first host group; and receiving, by a second master host in the first host group, a second data block of the file using half input bandwidth of the first master host in the first host group.

7. The method of claim 6, wherein the sending, by the at least one master host in the first host group, the at least one data block to both at least one master host in the second host group and a first, non-master host in the first host group comprises:

sending, by a first master host in the first host group, the first data block received simultaneously to both a first master host in the second host group using half output bandwidth of the first master host in the first host group and the first, non-master host in the first host group using half output bandwidth of the first master host in the first host group; and sending, by a second master host in the first host group, the second data block received simultaneously to both a second master host in the second host group using half output bandwidth of the second master host in the first host group and the second, non-master host in the first host group using half output bandwidth of the second master host in the first host group.

8. The method of claim 1, wherein one host is selected as the master host in each host group, wherein the at least one data block is sent in one of following ways:

first to the at least one master host in the second host group and then to the first, non-master host in the first host group;

first to the first, non-master host in the first host group and then to the at least one master host in the second host group; or to the at least one master host in the second host group and the first, non-master host in the first host group simultaneously.

9. A computer system comprising one or more computer processors coupled to a computer-readable memory unit, said memory unit comprising instructions that when executed by the one or more computer processors implement a method for transmitting a file to a plurality of hosts in a cluster, wherein the plurality of hosts are divided into a plurality of host groups, and at least one host in each host group is selected as a master host, and the file is divided into one or more data blocks, the method comprising:

receiving, by at least one master host in a first host group, at least one data block of the file, wherein the at least one data block is received from a file server;

sending, by the at least one master host in the first host group, the at least one data block to both at least one master host in a second host group and a first, non-master host in the first host group;

sending, by the first, non-master host in the first host group the at least one data block to a second, non-master host in the first host group; and sending, by the at least one master host in the second host group the at least one data block to both at least one master host in a third host group and a first, non-master host in the second host group.

10. The computer system of claim 9, wherein two hosts are selected as master hosts in each host group, and wherein the receiving, by at least one master host in the first host group, at least one data block of the file comprises:

receiving, by a first master host in the first host group, a first data block of the file; and receiving, by a second master host in the first host group, a second data block of the file.

11. The computer system of claim 10, wherein the sending, by the at least one master host in the first host group, the at least one data block to both at least one master host in a second host group and a first, non-master host in the first host group comprises:

sending, by a first master host in the first host group, the first data block received simultaneously to both a first master host in the second host group and the first, non-master host in the first host group; and sending, by a second master host in the first host group, the second data block received simultaneously to both a second master host in the second host group and the second, non-master host in the first host group.

12. The computer system of claim 9, wherein two hosts are selected as master hosts in each host group, and wherein the receiving, by at least one master host in the first host group, at least one data block of the file comprises:

receiving, by a first master host in the first host group, a first data block of the file using half input bandwidth of the first master host in the first host group; and receiving, by a second master host in the first host group, a second data block of the file using half input bandwidth of the first master host in the first host group.

13. The computer system of claim 12, wherein the sending, by the at least one master host in the first host group, the at least one data block to both at least one master host in the second host group and a first, non-master host in the first host group comprises:

sending, by a first master host in the first host group, the first data block received simultaneously to both a first master host in the second host group using half output bandwidth of the first master host in the first host group and the first, non-master host in the first host group using half output bandwidth of the first master host in the first host group; and sending, by a second master host in the first host group, the second data block received simultaneously to both a second master host in the second host group using half output bandwidth of the second master host in the first host group and the second, non-master host in the first host group using half output bandwidth of the second master host in the first host group.

14. The computer system of claim 9, wherein one host is selected as the master host in each host group, wherein the at least one data block is sent in one of following ways:
   first to the at least one master host in the second host group and then to the first, non-master host in the first host group;
   first to the first, non-master host in the first host group and then to the at least one master host in the second host group; or
   to the at least one master host in the second host group and the first, non-master host in the first host group simultaneously.

15. A computer program product, the computer program product comprising a non-transitory computer readable storage medium having program instructions embodied therewith, the program instructions executable by one or more processors to cause the one or more processors to implements a method for transmitting a file to a plurality of hosts in a cluster, wherein the plurality of hosts are divided into a plurality of host groups, and at least one host in each host group is selected as a master host, and the file is divided into one or more data blocks, the method comprising:
   receiving, by at least one master host in a first host group, at least one data block of the file, wherein the at least one data block is received from at least one master host in a particular host group wherein the particular host group is a host group different from the first host group, a second host group, and a third host group;
   sending, by the at least one master host in the first host group, the at least one data block to both at least one master host in the second host group and a first, non-master host in the first host group;
   sending, by the first, non-master host in the first host group the at least one data block to a second, non-master host in the first host group; and
   sending, by the at least one master host in the second host group the at least one data block to both at least one master host in the third host group and a first, non-master host in the second host group.

16. The computer program product of claim 15, wherein two hosts are selected as master hosts in each host group, and wherein the receiving, by at least one master host in the first host group, at least one data block of the file comprises:
   receiving, by a first master host in the first host group, a first data block of the file; and
   receiving, by a second master host in the first host group, a second data block of the file.

17. The computer program product of claim 16, wherein the sending, by the at least one master host in the first host group, the at least one data block to both at least one master host in a second host group and a first, non-master host in the first host group comprises:

sending, by a first master host in the first host group, the first data block received simultaneously to both a first master host in the second host group and the first, non-master host in the first host group; and
   sending, by a second master host in the first host group, the second data block received simultaneously to both a second master host in the second host group and the second, non-master host in the first host group.

18. The computer program product of claim 15, wherein two hosts are selected as master hosts in each host group, and wherein the receiving, by at least one master host in the first host group, at least one data block of the file comprises:
   receiving, by a first master host in the first host group, a first data block of the file using half input bandwidth of the first master host in the first host group; and
   receiving, by a second master host in the first host group, a second data block of the file using half input bandwidth of the first master host in the first host group.

19. The computer program product of claim 18, wherein the sending, by the at least one master host in the host group, the at least one data block to both at least one master host in the second host group and a first, non-master host in the first host group comprises:
   sending, by a first master host in the first host group, the first data block received simultaneously to both a first master host in the second host group using half output bandwidth of the first master host in the first host group and the first, non-master host in the first host group using half output bandwidth of the first master host in the first host group; and
   sending, by a second master host in the first host group, the second data block received simultaneously to both a second master host in the second host group using half output bandwidth of the second master host in the first host group and the second, non-master host in the first host group using half output bandwidth of the second master host in the first host group.

20. The computer program product of claim 15, wherein one host is selected as the master host in each host group, wherein the at least one data block is sent in one of following ways:
   first to the at least one master host in the second host group and then to the first, non-master host in the first host group;
   first to the first, non-master host in the first host group and then to the at least one master host in the second host group; or
   to the at least one master host in the second host group and the first, non-master host in the first host group simultaneously.

* * * * *